(12) United States Patent
Udy

(10) Patent No.: US 7,800,639 B2
(45) Date of Patent: Sep. 21, 2010

(54) LASER PULSE IMAGE SWITCHES

(76) Inventor: Joseph Dale Udy, 4466 S. Helena Way, Apt. 362, Aurora, CO (US) 80015-4415

( * ) Notice: Subject to any disclaimer, the term of this patent is extended or adjusted under 35 U.S.C. 154(b) by 635 days.

(21) Appl. No.: 11/051,604

(22) Filed: Feb. 4, 2005

(65) Prior Publication Data

US 2005/0157162 A1    Jul. 21, 2005

Related U.S. Application Data

(63) Continuation-in-part of application No. 09/784,773, filed on Feb. 15, 2001, now abandoned.

(51) Int. Cl.
  *B41J 15/14* (2006.01)
  *B41J 27/00* (2006.01)
  *G02B 6/00* (2006.01)
(52) U.S. Cl. ............... 347/241; 347/256; 385/133
(58) Field of Classification Search ......... 347/241, 347/256, 255, 239; 385/31–38, 89, 133–147, 385/116, 121, 15–18, 119; 372/102; 264/1.24; 362/551–559; 356/506; 462/8
See application file for complete search history.

(56) References Cited

U.S. PATENT DOCUMENTS

| | | | | |
|---|---|---|---|---|
| 3,489,482 | A * | 1/1970 | Brill | ............ 385/116 |
| 3,920,951 | A | 11/1975 | Chovan et al. | |
| 4,534,615 | A * | 8/1985 | Iwasaki | ............ 385/121 |
| 5,331,443 | A | 7/1994 | Stanisci | |
| 5,421,779 | A * | 6/1995 | Castro | ............ 462/8 |
| 5,598,264 | A * | 1/1997 | Failes | ............ 356/506 |
| 5,673,139 | A | 9/1997 | Johnson | ............ 359/291 |
| 5,745,301 | A | 4/1998 | Betensky et al. | |
| 5,754,712 | A | 5/1998 | Tanaka et al. | |
| 5,859,945 | A * | 1/1999 | Kato et al. | ............ 385/89 |
| 5,877,899 | A | 3/1999 | Stern et al. | |
| 5,936,759 | A | 8/1999 | Buttner | |
| 6,005,990 | A | 12/1999 | Barret et al. | |
| 6,031,561 | A * | 2/2000 | Narayan et al. | ............ 347/255 |
| 6,075,239 | A | 6/2000 | Aksyuk et al. | ............ 250/229 |
| 6,198,566 | B1 | 3/2001 | Takeda et al. | |
| 6,292,305 | B1 | 9/2001 | Sakuma et al. | |
| 6,317,276 | B1 | 11/2001 | Braat | |
| 6,389,190 | B2 | 5/2002 | Solgaard et al. | ............ 385/18 |
| 6,466,185 | B2 | 10/2002 | Sullivan et al. | |
| 6,760,505 | B1 * | 7/2004 | Street et al. | ............ 385/18 |

(Continued)

FOREIGN PATENT DOCUMENTS

JP    09274119 A  *  10/1997

(Continued)

OTHER PUBLICATIONS

Gibbs, W. Wayt, "Computing at the Speed of Light" Scientific American, Nov. 2004, pp. 80-87, Scientific American Inc., New York, NY, USA.

(Continued)

*Primary Examiner*—Hai C Pham

(57) ABSTRACT

Micro-symbols or scenes formed on the optical surfaces of laser diode arrays, MEMS arrays, and optical fiber image tunnel arrays, and the like, allow these devices to function as laser pulse image switches, producing streams of laser pulses, each an image of the micro-symbols or scenes.

2 Claims, 4 Drawing Sheets

U.S. PATENT DOCUMENTS

2002/0136258 A1* 9/2002 Starodubov ............... 372/102

FOREIGN PATENT DOCUMENTS

| JP | 11218421 A | * | 8/1999 |
| JP | 11-218421 | | 10/1999 |

OTHER PUBLICATIONS

Alexander Hellemans, "Attosecond Laser Pulses", Scientific American, May 2004, p. 38, Scientific American Inc., New York, NY, USA.
G. Dan Hutcheson, "The First Nanochips", Scientific American, Apr. 2004, pp. 76-83, see 80 CR, Scientific American Inc., New York, NY, USA.
Graham P. Collins, "Seeing Single Photons", Scientific American, Jan. 2004, pp. 24-25, Scientific American Inc, New York, NY, USA.
Graham P. Collins, "Heat and Light", Scientific American, Jan. 2003, pp. 26 & 28, Scientific American Inc., New York, NY, USA.
Hopkins, J., et al., "Ultrashort-Pulse Lasers", Scientific American, Sep. 2000, pp. 72-79, see "imaging" p. 74.
Stix, G., "The Triumph of the Light", Scientific American, Jan. 2001, pp. 80-86, general.
Bishop, D., et al., "The Rise of Optical Switching", Scientific American, Jan. 2001, pp. 88-94, see 'Terabits per Second' (MEMS) p. 90++.
Blumenthal, D., "Routing Packets with Light", Scientific American, Jan. 2001, pp. 97-99, general.
Robert R. Alfano, "The Ultimate White Light", Scientific American, Dec. 2006, pp. 86-93, Scientific American Inc., New York, NY, USA.

* cited by examiner y-axis
+ x-axis

LASER PULSE IMAGE SWITCHES

This is a Continuation-in-Part of patent application Ser. No. 09/784,773, "MINUSCULE IMAGES OF ALPHANUMERIC SYMBOLS" of Joseph D. Udy, filed 2001, Feb. 15 now abandoned, Primary Examiner, Brian M. Healy/GAU 2883.

BACKGROUND

1. Field of Invention

This invention relates to switches and to the use of very small information symbols or scenes on MicroElectroMechanical System (MEMS) optical gratings, prisms and/or on the exit mirrors of laser arrays and/or exit lenses of laser diode arrays and/or optical fiber image tunnels, and similar optical surfaces, and the like. Definition: "image" defined as the pattern or form or relative position of photons in an optical pulse, beam or front as it moves through space, optical fibers and the like. These "images" become visible when the photons encounter a surface or are displayed, this is, also, commonly called an image.

2. Context and Prior Art

The use of binary switches and the resulting binary code have required that relatively long binary code strings be used to represent or transmit simple symbols. The output or product of "LASER PULSE IMAGE SWITCHES" could be a stream (string) of very short (e.g. femtosecond) laser pulses, small enough (diameter or cross section) to be carried on optical fiber systems. Each laser pulse being a discrete, separate, image of information symbols or scenes and the like, optically corrected as needed.

The following four patents: Sakuma et al., U.S. Pat. No. 6,292,305 B1; Betensky et al., U.S. Pat. No. 5,745,301; Tanaka et al., U.S. Pat. No. 5,754,712; and Braat, U.S. Pat. No. 6,317,276 B1; disclose operations on images, respectively: display; demagnification; searching, storing and displaying; writing and/or reading. They do not create the image signal or image input. The creation of the image signal or image input as laser pulse images would be the purview of this present invention "LASER PULSE IMAGE SWITCHES", a streaming, laser pulse image output device.

Sakuma et al., U.S. Pat. No. 6,292,305 B1 disclose a virtual screen display apparatus and . . . a relatively small image display for displaying characters or image information . . . [apparently of a size to be human observable]. As shown in FIG. 15, (Sheet 15 of 20, lower left) and described in Column 1, Lines 5-10 this device displays images which are created by an output device. The creation of these images would be the purview of "LASER PULSE IMAGE SWITCHES", an image output device.

Lens systems to produce small images of varying magnification for detection by an electronic imaging system are disclosed by Betensky et al. (U.S. Pat. No. 5,745,301).

An image processing apparatus for searching, storing, and displaying characters, sentence fragments, sentences or documents is disclosed by Tanaka et al. (U.S. Pat. No. 5,754,712).

An optical lens system and scanning device for reading and/or writing information in an information is disclosed by Braat (U.S. Pat. No. 6,317,276 B1).

The absolute/unique distinction between, the four patents referenced above (Sakuma et al., Betensky et al, Tanaka et al., and Braat) and "LASER PULSE IMAGE SWITCHES", can be demonstrated by reference to Sakuma et al., U.S. Pat. No. 6,292,305 B1, Sheet 15 of 20, FIG. 15. In the lower left corner of FIG. 15 is the term "IMAGE SIGNAL", (input port), to the left of that would be the purview of "LASER PULSE IMAGE SWITCHES", an image output device.

The same distinction would apply to the other three patents: Tanaka et al., U.S. Pat. No. 5,754,712, Sheet 1 of 23, FIG. 1, upper left, "IMAGE INPUT UNIT", above that would be the purview of "LASER PULSE IMAGE SWITCHES". Betensky et al., U.S. Pat. No. 5,745,301, ABSTRACT, First sentence, "Variable power lens systems for use with electronic imaging systems, e.g. systems employing CCDs, are provided.", would be synergistic with the purview of "LASER PULSE IMAGE SWITCHES". Braat, U.S. Pat. No. 6,317,276 B1, Abstract, last sentence, "This lens system is very suitable for a scanning device and an apparatus for reading/writing high-density optical discs.", would be synergistic with the purview of "LASER PULSE IMAGE SWITCHES".

"LASER PULSE IMAGE SWITCHES" would likely be synergistic with OCR equipment.

The prior four patents refer to operations performed on mages which could be created, or produced by "LASER PULSE IMAGE SWITCHES", as an output of laser pulse micro-image streams or strings.

"An electrically actuated microelectromechanical television scanning device for television image scanning or related functions. The scanning device can be produced in forms having characteristic dimensions in the submillimeter range . . . " is disclosed by Johnson (U.S. Pat. No. 5,673,139). This patent does not show or infer any attempt or concept to create, form or etch, information symbols or scenes onto the switch elements, i.e. optical surfaces (optical gratings, laser exit mirrors, or the like). Hence, Johnson, U.S. Pat. No. 5,673,139, does not anticipate "LASER PULSE IMAGE SWITCHES".

A " . . . light-actuated photonic switch is disclosed . . . " by Aksyuk et al., U.S. Pat. No. 6,075,239. This patent does not describe any attempt or concept of creating, forming or etching information symbols or scenes onto the switch elements, i.e. optical surfaces (reflectors, prisms, or the like). Hence, Aksyuk et al., U.S. Pat. No. 6,075,239, does not anticipate "LASER PULSE IMAGE SWITCHES".

"A cross-connect switch for fiber-optic communication networks employing a wavelength dispersive element, such as a grating, and a stack of regular (non-wavelength selective) cross bar switches using two-dimensional arrays of micromachined, electrically actuated, individually-tiltable, controlled deflection micro-mirrors for providing multiport switching capability for a plurality of wavelengths . . . " is disclosed by Solgaard et al., U.S. Pat. No. 6,389,190 B2. The word "image" is used in several places in Column 2, it is clear, from the context, that the meaning is to position or focus the optical beams onto mirrors or fiber ends. This patent does not describe any attempt or concept of creating, forming, or etching information symbols or scenes on the switch elements, i.e. optical surfaces (micro-mirrors, gratings, or the like). Hence, Solgaard et al., U.S. Pat. No. 6,389,190 B2, does not anticipate "LASER PULSE IMAGE SWITCHES".

The above patents: Johnson, U.S. Pat. No. 5,673,139, Aksyuk et al., U.S. Pat. No. 6,075,239, and Solgaard et al., U.S. Pat. No. 6,389,190 B2, are likely to be synergistic with "LASER PULSE IMAGE SWITCHES".

Sullivan et al, U.S. Pat. No. 6,466,185 B2, "Multi-Planer Volumetric Display System and Method of Operation Using Psychological Vision Cues" discloses " . . . An image projector selectively projects images on respective optical elements to generate a volumetric three-dimensional image viewable in the multi-surface optical device. Psychological vision cues are added . . . " (Abstract). Note: The above is clearly a human scale display device. Sullivan continues " . . . In a further embodiment, different technologies may be used to implement the SLM (spatial light modulations) provided that high speed operation is attained. For example high speed liquid crystal devices, modulations based on micro-electromechanical (MEMS) devices, or other light modulating method may be used to provide such high frame rate imaging. For example, the Digital Light Processing (DLP) technology of TEXAS INSTRUMENTS, located in Dallas Tex.; the Grating Light Valve (GLV) technology of SILICON LIGHT MACHINES, located in Sunnyvale, Calif.; and the analog ferroelectric LCD devices of BOULDER NONLINEAR SYSTEMS, located in Boulder, Colo., may be used to modulate the images for output by the image projector 20. Also, the SLM may be a ferroelectric liquid crystal (FLC) device, and polarization biasing of the FLC SLM may be implemented.

To obtain very high resolution images in the MVD (Multi-Planer Volumetric Display) system 10, the images 44-50 must be appropriately and rapidly re-focused onto each corresponding optical element of the MOE (multiple optical element) device 32, in order to display each corresponding image on the optical element at the at the appropriate depth . . . . " (Col. 12, Lines 49-68+).

This patent does not describe any attempt or concept of etching information symbols or scenes onto MEMS gratings, laser diode arrays, or optical surfaces. Sullivan et al., U.S. Pat. No. 6,466,185 B2, does not anticipate "LASER PULSE IMAGE SWITCHES".

Also, Sullivan, FIG. 1, lower center, shows "Graphic Input Source", to the right of that would be the purview of "LASER PULSE IMAGE SWITCHES", an image output device.

"Optical Switching Device, Picture Display and Projection Apparatus", U.S. Pat. No. 6,198,566 B1 to Takeda et al., discloses . . . " a light guiding member equipped with a total reflection surface capable of transmitting an incoming light ray for image display by means of total reflection, and an optical switching member having a micro prism that extracts evanescent light leaking out of the total reflection surface and reflects it to a display area of the total reflection surface. "(Abstract).

Takeda et al., discloses an "ON/OFF" optical switch, FIGS. 2 & 3 and Col. 2, line 29 et al.

This patent does not describe any attempt or concept of etching, information symbols or scenes into the switch elements, i.e. optical surfaces (micro-mirrors, gratings, microprisms, or the like). Hence, Takeda et al., U.S. Pat. No. 6,198,566 B1, does not anticipate "LASER PULSE IMAGE SWITCHES".

Barrett et al., U.S. Pat. No. 6,005,990, "System For Optically Scanning Images Using Optical Shutter", discloses " . . . a light source 102, a optical shutter 104, an optical sensor 106, and a scanner controller 108. The light source 102 and optical shutter 104 cooperatively "present" an image to the optical sensor 106 . . . and creates an electronic representation of the scanned image." (Col. 2, lines 52-65).

Barrett continues, " . . . the scanning cursor is the smallest possible unit of scanning resolution with a monolithic or segmented monolithic optical sensor. And, the entire image area is scanned by sequentially moving the scanning cursor in a pattern to systematically traverse the entire image area. For each sequential position of the scanning cursor, the optical sensor 106 measures the shuttered light corresponding to that region of the image area. For each of the many tiny regions of the image areas, then, the optical sensor 106 thus creates an electrical output signal representative of the light signal at that region . . . " (Col. 12, lines 2-15).

The Applicant respectfully asserts that the reference (Col. 1, lines 30-31, FIGS. 1, 8, 10 11, 12) discloses " . . . optical image scanning by presenting the image to an optical sensor via an optical shutter . . . " and that optical shutter scanning by a scanning device with transparent qualities does not anticipate; discrete, separate, laser light pulse images with a predetermined duration (femtosecond) and a predetermined size and the like.

This patent does not describe any attempt or concept of etching information symbols or scenes on the switch elements, i.e. optical surfaces (gratings, laser exit mirrors, laser diode lenses, optical fibers, or the like). Hence, Barrett et al., U.S. Pat. No. 6,005,990, does not anticipate "LASER PULSE IMAGE SWITCHES".

"Arrangement for Shifting Optical Images Between Individual Channels" to Buttner, U.S. Pat. No. 5,936,759, discloses" . . . A plurality of imaging optical systems adapted to image conjugately upon each other, in an associated shiftable optical channel, an associated plane and an intermediate image plane, comprise a micro-mechanical mirror system (mirror array) arranged in . . . such a manner, that they optically connect optionally one of the shiftable channels to the common channel." (Abstract).

This patent does not describe any attempt or concept of, etching information symbols or scenes into the switch elements, i.e. optical surfaces (micro-mirrors, gratings, laser exit mirrors, or the like). Buttner, U.S. Pat. No. 5,936,759, does not anticipate "LASER PULSE IMAGE SWITCHES", a laser pulse image output device. Buttner and Solgaard do establish a generic means for shifting/switching of optical mages which could be used for shifting/switching of laser pulse images.

The above four patents: Sullivan et al., U.S. Pat. No. 6,466, 185 B2;
Takeda et al., U.S. Pat. No. 6,198,566, B1;
Barrett et al., U.S. Pat. No. 6,005,990; and
Buttner, U.S. Pat. No. 5,936,759; disclose operations on images, respectively: volumetric display, switching-display-projection, optically scanning, and shifting optical images.

They do not infer, imply, or describe the etching of information symbols or scenes into the optical surfaces of MEMS arrays, laser arrays, laser diode rays, optical fiber image tunnel arrays or the like.

The above four patents: Sullivan et al., U.S. Pat. No. 6,466, 185 B2;
Takeda et al., U.S. Pat. No. 6,198,566, B1;
Barrett et al., U.S. Pat. No. 6,005,990; and
Buttner, U.S. Pat. No. 5,936,759; are likely to be synergistic with "LASER PULSE IMAGE SWITCHES".

Stern et al., U.S. Pat. No. 5,877,899, Mar. 2, 1999, "Imaging System and Method for Imaging Indicia on Wafer", Relevant: Abstract; " . . . imaging system for viewing indicia of an object to be observed in which the indicia comprises . . . either hard and/or soft marks . . . ", and Col. 4, lines 12-13, " . . . the invention is to provide an inspection system . . . ", and, (Applicant Note: Stern et al., is using/defining "imaging" to be viewing/observing/inspecting of preexisting indicia, such as in), Col. 5, lines 9-26+, " . . . imaging system for imaging a desired surface of an object to be observed and containing indicia; . . . ", and Col. 6, lines 9-13, " . . . FIG. 3 is . . . the inspection system according to the present invention. FIG. 3A is . . . the simplest form of the inspection system . . . ", and in Col. 7, lines 21-24+, " . . . The present invention makes use of . . . an inspection device . . . ", and in Col. 8, lines 15-18+, " . . . the inspection system, according to the present invention, . . . " and in Col. 8, lines 26-40+, " . . . light emitting diodes (LED) 66, . . . lenses 36 and 38 . . . , mirror 40 . . . , to reflect the focused light at the object 32 to be observed." And Col. 7 lines 63-65, " . . . the reflected . . . light will be captured by . . . the camera 52 and used to image the indicia 30 on the object to be observed 32."

Further; Stern et al., U.S. Pat. No. 5,877,899, "Imaging System and Method for Imaging Indicia on Wafer", Col. 6, lines 12-14, read "FIG. 3A . . . simplest form of the inspection system . . . .", discloses several (more than 3) parts. In general overview the present invention is far simpler, i.e. fewer parts, than the Stern et al., '899, Imaging System . . . , reference.

Simplicity of this present invention, to create/form laser pulse images. The present invention, in a simple form (symbols formed on the exit lenses of a laser diode array) has one part (the laser diode array), a laser pulse from a laser diode in the array forms a laser pulse image of the symbol(s) on that specific diode exit lens, FIGS. 4-6.

The present invention also includes a form with two parts, a laser, and a MEMS switch with symbols formed on the optical surfaces, gratings, FIGS. 1-3. A reflected laser pulse forms a reflected laser pulse image of the symbol(s) on that particular optical surface or grating.

Stern complexity, 3 or more parts, see FIG. 3A. Stern et al.,-899, Col. 6, line 12, reads "FIG. 3A . . . the simplest form of the inspection system . . . ." (Note the term "system".) The text description of FIG. 3A, Col. 11, lines 6-59, and FIG. 3A, describes 3 or more parts. Note: FIG. 11, added more parts, (a light valve and a diffuser), making the Stern "system" more complex. The Stern "system" reference does not, repeat not and could not anticipate this present invention, in toto.

Present invention, lasers: Stern apparently not a laser system. Stern et al Col. 6, lines 48-50, reads "FIG. 11 . . . a fifth embodiment . . . ". And Col. 14, lines 12-14, reads " . . . a programmable liquid crystal light valve used in conjunction with a high density diffused back light . . . " and lines 17-19, read "FIG. 11 shows . . . a light source 84 provides light to a rear surface 86 of a diffuser 88. The diffused light emanates . . . ". Note: This "fifth embodiment" specifies "diffused" light. The prior four embodiments appear to specify "diffused" light. Lasers are not specified. Stern, Col. 8, lines 26-27, reads " . . . light emitting diodes (LED) 66 . . . ". Col. 13, lines 23-28, read " . . . by placing a diffuser 70 in front of the LED array, i.e. between the LEDs 66 . . . make the light field created by each LED 66 appear substantially identical to that of all other LEDs contained in the array (see FIG. 8)." Further, Col. 8, lines 26-27, reads " . . . light emitting diodes (LED) 66 . . . ". Note: the coherent light property of lasers would likely be destroyed in the diffusers, 70, 88, of the Stern "system". The description of the first five embodiments of the Stern system does not specify lasers, and Stern does not contain the terms "laser pulses", "reflected laser pulses", "laser pulse images", "reflected laser pulse images" or "laser pulse image switches". The Stern '899 reference does not, repeat not, and could not anticipate the present invention.

Present invention, active; Stern '899 is passive Stern specifies the "object to be observed 32" to be a "semiconductor wafer" as in FIG. 1. A static semiconductor wafer, as specified by Stern, has no, repeat no switching capabilities comparable to the well known switching capabilities of MEMS switches, Stern, as described, is not a "laser pulse image switch". Stern does not contain the terms "MEMS optical gratings" or "MEMS arrays". and Stern does not and could not anticipate the present invention. Stern et al., '899, may be synergistic with the present invention. Stern does not and could not anticipate the "laser pulse image switches" of the present invention. This present invention appears to be outside the envelope or box for Stern et al.

Stern et al. '899 does establish a generic means of viewing/observing/inspecting/indicia on a specular surface which may be adapted for use with the laser pulse images and the laser pulse image switches of the present invention.

Stern et al., does not, repeat not, contain or infer the phrases or concepts of "laser pulses, laser pulse images, or laser pulse image switches", and does not, repeat not, anticipate the present invention. An example of the difference, an embodiment of the present invention in a lap-top keyboard, such that pressing a key sends a laser pulse image to a lap-top computer, with a converter, often a distance of less than 30 centimeters.

It is obvious that the Stern device, would be "lacking" in a keyboard. The present invention and the Stern device are fundamentally different concepts in different devices or structures.

NOTICE Definitions; Mental adaptability required here: Stern et al. '899, (above), uses/defines "imaging" to be viewing/observing/inspecting of preexisting indicia, as with a camera. Chovan et al. '951, (below) uses/defines "imaging" to be etching/forming images onto a metallic surface, as with a laser beam.

Chovan et al., U.S. Pat. No. 3,920,951, Nov. 18, 1975, "Laser Etching Apparatus for Forming Photographic Images on Metallic Surfaces", Relevant: Abstract, " . . . laser etching apparatus for forming a photographic image on a metallic or non-metallic surface . . . an assemblage of laser etched craters. In dark regions of the picture, the craters occur in greater densities while in light regions of the picture, the craters occur in lesser densities . . . ", and Col. 1, lines 25-41, " . . . use of a laser to machine away an image on a thin film metallic film has been suggested. A transparency of appropriate size is illuminated with a high energy laser pulse and the image is focused down to a tiny micro image on the thin film . . . a demagnified version of the image on the transparency will be formed on the metal film . . . ", and Col. 1, lines 64-65, " . . . apparatus for etching photographic images upon a metallic surface.", and Col. 2, lines 25-28, " . . . The imaging means concentrates the laser energy to form a pit on the blank for each laser pulse, the pits locally altering the reflectivity of the blank, . . . " (see below) and Col. 4, lines 58-62, " . . . photodetector produces an electrical signal indicating the brightness of the picture element imaged on it and this electrical signal is then applied to the switching rate controller 20 to control the firing rate of the laser.". Note: Col. 2, lines 25-28, " . . . form a pit on the blank for each laser pulse . . . ". The Chovan use of laser pulses is as a metal surface deforming means, " . . . To form a pit on the blank for each laser pulse, . . . " Col. 2, lines 25-28 and " . . . using a laser for etching a photographic image onto a metal . . . ", Col. 3, lines 14-15. Note: Col. 2, lines 25-28, " . . . The imaging means . . . to form a pit . . . for each laser pulse . . . ". The Chovan language defines/uses "imaging" to refer to the formation/creation of an image/scene/picture on a metal surface. Chovan et al., does not, repeat not, infer the concept or contain the phrase "laser pulse image switches" and does not anticipate this present invention.

Chovan et al. contributes to the broad generic means of etching which could be used for forming symbols and or scenes onto the optical surfaces of MEMS gratings, lasers, laser diodes, optical fibers, and the like.

Stanisci, U.S. Pat. No. 5,331,443, Jul. 19, 1994, "Laser Engraved Verification Hologram and Associated Methods", Relevant: Abstract, " . . . laser etching individualized indicia into the reflective layer of each hologram . . . ", and Col. 3, lines 1-2, " . . . FIG. 1 further illustrates a laser 22 etching indicia 24 into the reflective aluminum layer 16 . . . ". Stanisci does not, repeat not, infer the concept or contain the phrase "laser pulse image switches" and does not anticipate this present invention.

These two patents: Chovan et al., U.S. Pat. No. 3,920,951, and Stanisci, U.S. Pat. No. 5,331,443, establish a very broad generic means for etching or forming which could be used for creating symbols or scenes into/onto the optical surfaces of MEMS grating, lasers, laser diodes, optical fibers, etc.

Stern et al., U.S. Pat. No. 5,877,899, establishes a broad generic means for viewing/observing/inspecting symbols or scenes which could be adapted for use on/in the optical surfaces of the present invention.

Another perspective on the difference/distinction between Stern et al., and the present invention; a laser pulse image switch embodiment in a keyboard, may accept keystrokes as input and generate respective laser pulse images as output, to a converter at a computer. Stern et al., in a keyboard, cannot reasonably be modified to work as a keyboard output.

These three patents: Stern et al., U.S. Pat. No. 5,877,899, and Stanisic, U.S. Pat. No. 5,331,443, and Chovan et al., U.S. Pat. No. 3,920,951, would likely be synergistic with this present invention.

The unique, enabling paradigm of "LASER PULSE IMAGE SWITCHES" is the etching means for etching, creation, or formation of information symbols or scenes onto the optical surfaces of MEMS arrays, laser arrays, laser diode arrays, optical fiber image tunnel arrays or the like, and the laser pulse image means for creation of ultra-short pulse laser images, and the switching means for selective switching of these laser pulse images to create a string or streams of laser pulse images, and the transmission means for transmitting laser pulse images.

The prior art is void of this paradigm, in toto.

The prior art above appears void of the concept of: laser pulse image switches, laser pulse image streams or of etching or forming (indicia) symbols or scenes into/on the optical surfaces of pulse lasers, such that the emitted laser pulse is a laser pulse image. The present invention, embodiment, with ultrashort pulse lasers reflected by/from microsymbols on MEMS optical gratings to form laser pulse reflected image streams is not described or inferred by Stern et al. Also, the present invention, in a wide perspective, provides for active, multi-path, real-time, communications, these arenas are just not "within" the Stern et al. reference.

The state of the art for Ultra-Short Pulse Lasers, fiber optics, optical switching, and optical packet routing are described in Scientific American, September 2000 and January 2001. Single proton detectors and "metamaterials" (negative index of refraction) have been described in Scientific American, January 2004 and January 2003. Etching and optical proximity correction and attosecond ($10^{-18}$) laser pulses are described in Scientific American, April 2004 and May 2004. Optical computing (bit based) has been described in Scientific American, November 2004. This present invention, laser pulse image switches, utilizing the above and other known corrective optics techniques, may evolve toward attosecond pulse laser sub-micro-image switches in completely optical systems/structures and devices which count photons as a communication method. Note: The phrases "laser pulse images, and laser pulse image switches, and laser pulse image streams" are not in the prior art.

The operation and function of MEMS and arrays is well known in prior art and the transmission of laser pulses in optical fibers has been practiced since the mid 1970s, and may be considered common practice, and a broad generic means which could be adapted/used for transmitting laser pulse images.

Another perspective: As the Applicant understands it, the state of the art of optical communication is concerned with the pulses of laser light as a binary, on/off, code of communications.

The present invention is concerned with laser pulse images, i.e. pattern and number of photons with-in/comprising a laser pulse, as a means of communications.

Objects and Advantages:

Information, including scenes and/or alphanumeric symbols, formed onto the optical surfaces of MEMS arrays, laser arrays, laser diode arrays, optical fiber image tunnel arrays or the like, allow the representation, switching and/or transmission of very small images with very short pulses of laser light and formation of laser pulse image streams/strings.

One embodiment, an array of 256 image switch elements (MEMS gratings, laser diode arrays and the like) with alphanumeric symbols on each switch element could function as an alphanumeric image string switch.

The use of a, sequence label, in the switch address system would allow switching to any/all of the 256 image switch elements in any sequence, with each address operation. By including a, sequence plus time index label, the potential alphanumeric image string can become extremely long for each address operation.

The advantage of laser pulse image switches would be the increased efficiency of directly switching, transmitting, manipulating, and storing information as laser pulse images of alphanumeric symbols or scenes, without the archaic conversion into binary code and the subsequent decoding.

Summary:

Information symbols or scenes formed on the optical surfaces of laser diode arrays, MEMS arrays, and optical fiber tunnel image arrays, and the like, allow these devices to function as laser pulse information image switches, producing a string of laser pulses, each an image of information symbols or scenes. These information symbols or scenes can be very, very small. The laser pulses (coherent light), of predetermined size, duration, dimension, frequency, and the like, create strings/streams of laser pulse images of these information symbols or scenes. These switches would be used in optronic/photonic devices and systems/networks.

DRAWINGS DESCRIPTION, BRIEF

Understood: as an effort toward clarity, all of the support elements for the drawings structures are built into a single working/functioning structure label. These support elements include, but are not limited to computing means, timing means, control means, storage means, power means and others as needed for a functioning structure/device. MEMS elements, by definition, are very, very small.

FIG. 1, context schematic of a MEMS based, laser pulse image switch.

Figure 4:
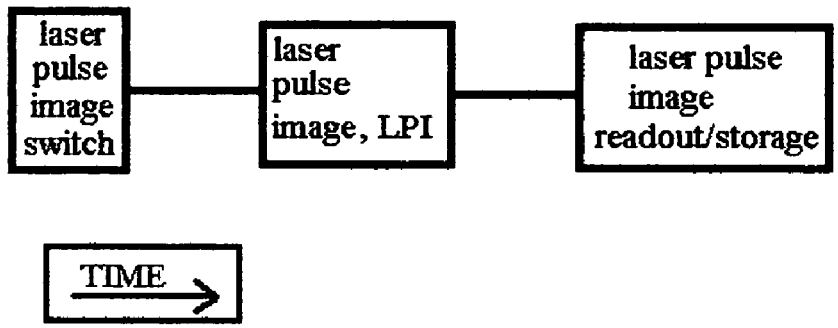

FIG. 4, context schematic of a laser based, laser pulse image switch.

Figure 5:
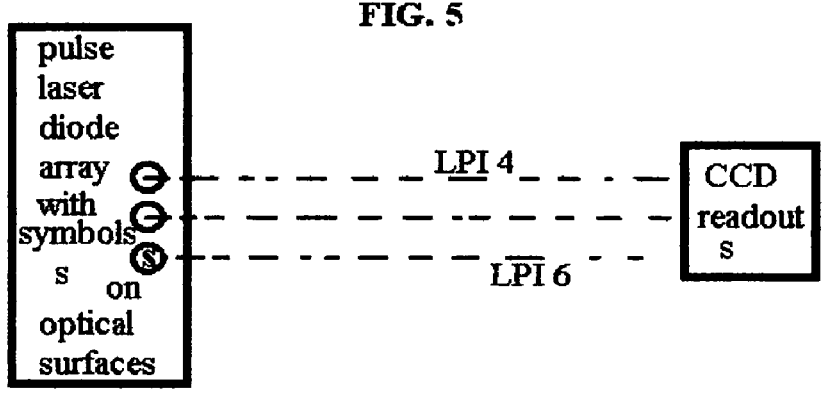

FIG. 5, illustrates pulse laser diode arrays with symbols, s, on the optical surfaces, (diode exit lenses), and the laser pulse images of s, LPI 4-6, and the CCD readout, s.

Figure 6:
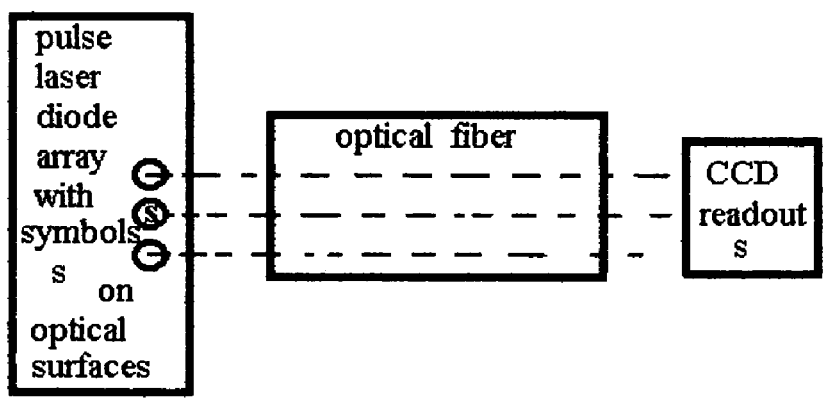

FIG. 6, illustrates pulse laser diode arrays with symbols, s, on the optical surfaces, (diode exit lenses), and the laser pulse images of s, LPI 4-6, transmitted through an optical fiber, and the CCD readout, s.

Figure 7:
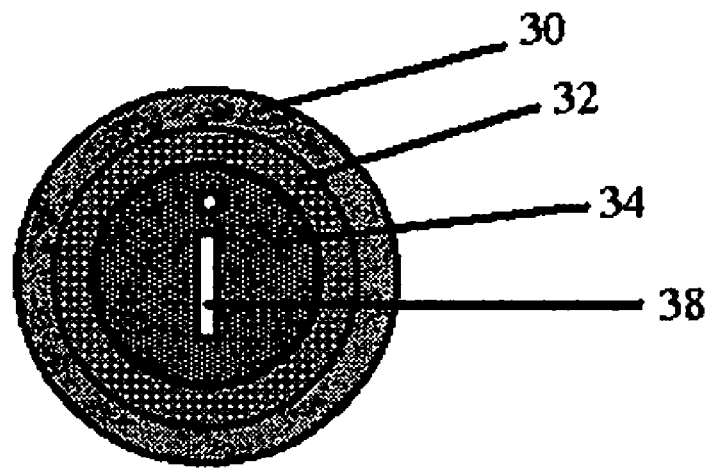

FIG. 7, schematic detail of MEMS image grating, not to scale.

Figure 8:
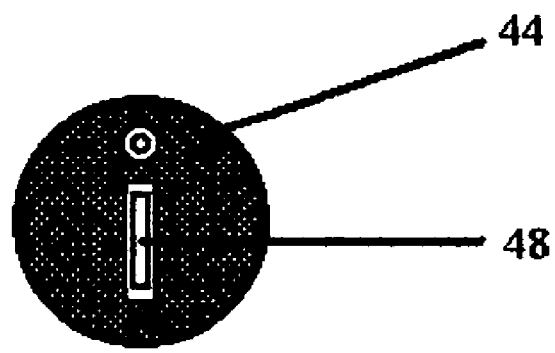

FIG. 8, schematic detail of laser diode image lens, not to scale.

Figure 9:
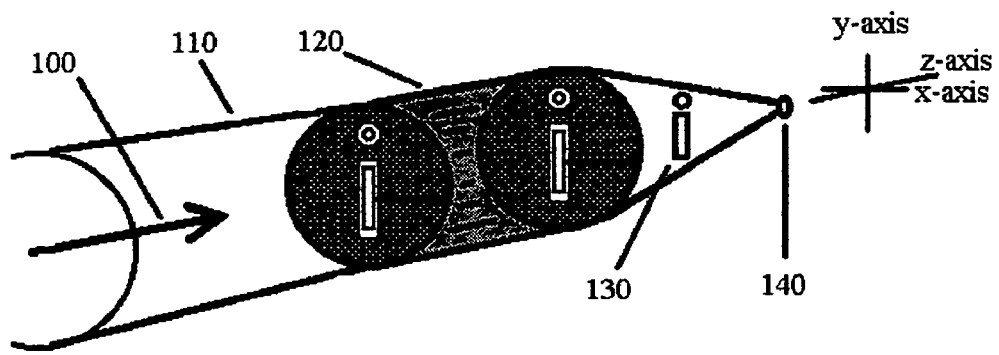

FIG. 9, schematic detail of optical fiber image tunnel, not to scale.

Figure 10:
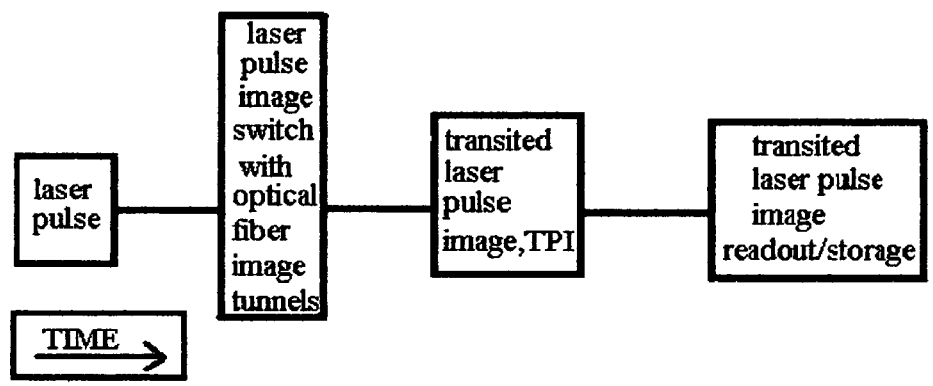

FIG. 10, context schematic of an optical fiber image tunnel based, laser pulse image switch.

Figure 11:
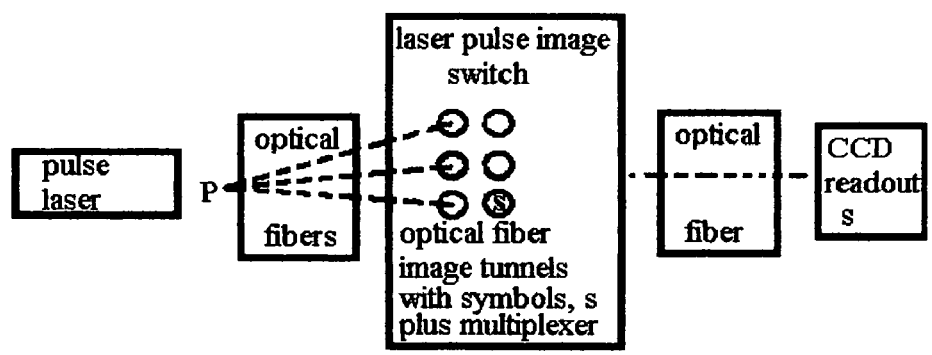

FIG. 11, illustrates laser pulses, P, transiting optical fibers (optional), entering an array of optical fiber image tunnels with symbols, s, and multiplexed to a common output optical fiber to the CCD readout of s.

DRAWINGS—REFERENCE NUMBER KEY

30 Optical grating control rings.
32 Optical grating control rings.
34 schematic of a image MEMS optical grating, not to scale.
38 positively, reflecting symbol, "i", on a nonreflecting background.
44 schematic of a image laser diode exit lens, modified such that the emitted laser pulse is a laser pulse image of "i".
48 possible optical correction pattern, such that the received laser pulse image is "i".
100 ultra short pulse of unformed, but coherent, laser photons.
110 optical fiber.
120 optical fiber image tunnel, assembled disks of optical fiber, each etched with micro-prisms or gratings to direct the out lying photons into the symbol image sector; tunnel length sufficient to fully form and stabilize the laser pulse image before exiting as an optically corrected laser pulse image, recognizable, "i", when received.
130 optically corrected laser pulse image, recognizable when received.
140 receiver: CCD readout, converter, photon counter and similar others.

DRAWINGS DESCRIPTION, DETAILED

Figure 1:
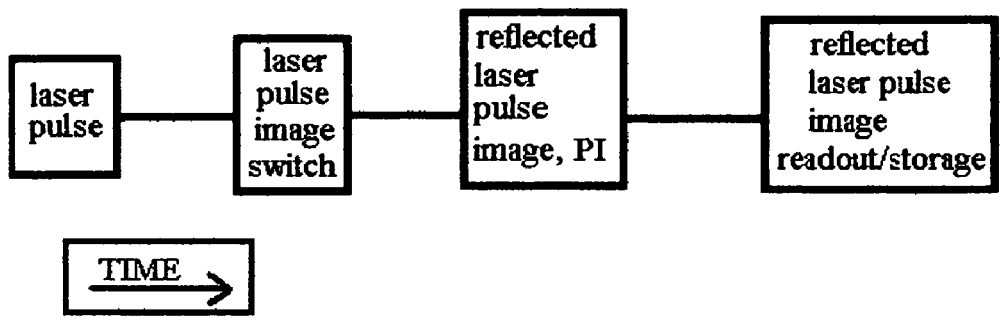

FIG. 1, context schematic of a MEMS based laser pulse image switch, shows the laser pulse source, (pulse laser), sending a laser pulse to the MEMS based laser pulse image switch, to create a laser pulse image, PI, and the laser pulse image readout and/or storage.

Figure 2:
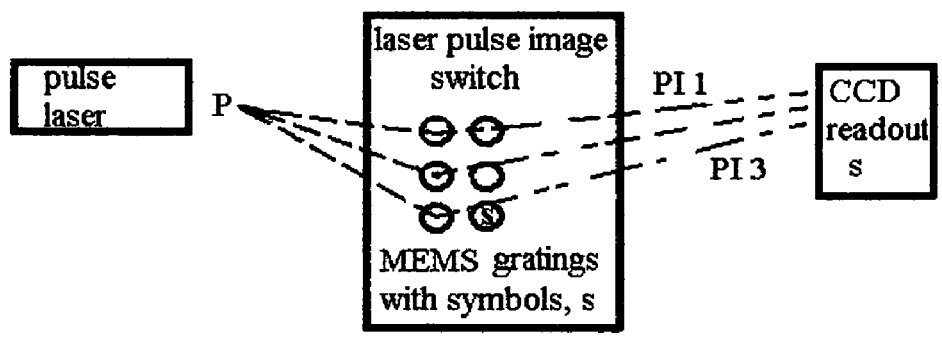
FIG. 2, illustrates the laser pulses, P, reflected at the array of MEMS optical gratings with symbols, s, to create/form the reflected laser pulse images of s, PI 1-3 and the CCD readout, s.

FIG. 2, illustrates the pulse laser, sending laser pulses, P, to the MEMS based, laser pulse image switch. The MEMS gratings have symbols, s, formed thereon and the reflected laser pulses create, form, reflected laser pulse images, PI 1-3, of the symbols, s. The reflected laser pulse images, PI, go to a CCD readout, of s.

Figure 3:
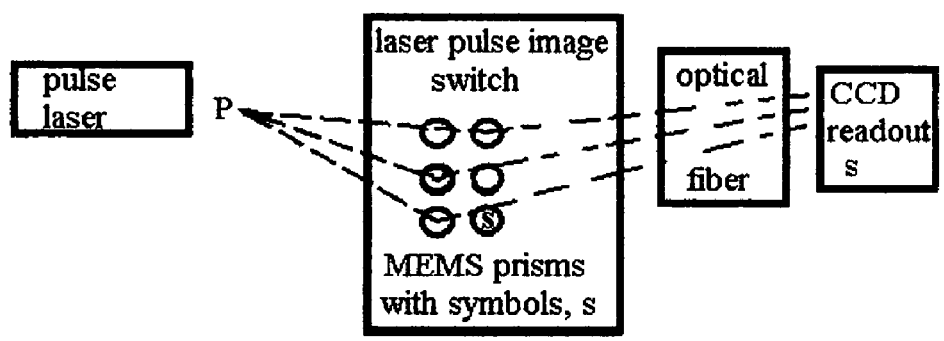
FIG. 3, illustrates the laser pulses, P, reflected at the MEMS prism array with symbols, s, to create the reflected laser pulse images of s, PI 1-3, transmitted through an optical fiber, and the CCD readout, s.

FIG. 3, illustrates optical fiber(s) may transmit the laser pulse images of FIG. 2. Note 1: These MEMS based laser pulse image switches may also be described as:
An optronic/photonic device comprising:
at least one reflective symbol etched or formed on the optical grating of MEMS switches, and;
at least one laser pulse, whereby the laser pulse is reflected from said symbol and forms a reflected laser pulse image of said symbol.

FIG. 4, context schematic of a laser based, laser pulse image switch, the emitted laser pulses are the laser pulse images, LPI, and go to the laser pulse image readout, storage.

FIG. 5, pulse laser diode array with symbols, s, formed on the optical surfaces, exit lenses, such that the emitted laser diode pulses are laser pulse images, LPI 4-LPI 6, which go to a CCD readout of s.

FIG. 6, illustrates optical fiber(s) may transmit the laser pulse images, LPI, to the CCD readout of s.

Note 2: This embodiment of laser pulse image switches may be described as:
An optronic/photonic device comprising:
at least one symbol formed on the lens of at least one laser diode, and;
at least one laser pulse from said laser diode whereby said laser pulse is the laser pulse image of said symbol.

Note 3: This present invention, laser pulse image switches, may be generically described as: optical surfaces with symbols formed thereon, and;
pulse lasers whereby images of said symbols are formed, and,
a multiplexer whereby streams of said images are formed.

FIG. 7 schematic of a MEMS grating, 34, not to scale, with the surface modified to form a positively, reflecting symbol, "i", 38, on a nonreflecting background, an optical grating. A laser pulse reflected by the i and not by the background, would form a reflected laser pulse image of "i". Various techniques could be applied as needed to keep the laser pulse image coherent, i.e. optical proximity correction, and adaptive optics, and corrective micro-optics, and the like. Grating control rings, 30 and 32, are common, and control the tilt (switching capability) of MEMS gratings.

FIG. 8 schematic detail of laser diode exit lens, 44, not to scale, illustrating an embodiment, with a possible optical correction pattern, 48, such that the received laser pulse image is "i".

FIG. 9, schematic detail of optical fiber image tunnel, 120, not to scale, the incoming ultra-short laser pulse, 100, transits the optical fiber, 110, to the optical fiber image tunnel, 120, several wavelengths in length such that the coherent light pulse stabilizes and exits the fiber image tunnel as a laser pulse image of "i", 130, optically corrected (adaptive optics) to be recognized when received, 140.

FIG. 10, context schematic of a laser pulse image switch based on an array of optical fiber image tunnels. The laser pulse transits an optical fiber image tunnel (ofit) to exit the tunnel as a transited laser pulse image, TPI, and the readout/storage of the transited laser pulse image.

FIG. 11, illustrates laser pulses, P, transiting optical fibers (optional), entering elements of an array of optical fiber image tunnels with symbols, s, and a multiplexer, coordinating the transited laser pulse images into a stream in the common output optical fiber to the CCD readout of s.

These optical fiber image tunnels can also be described as: assembled disks of symbol etched optical fiber, each etched with micro-prisms or gratings or mirrors to direct the out lying photons into the symbol image tunnel sectors; the tunnel length sufficient to fully form and stabilize the transiting laser pulse image before it exits as an optically corrected laser pulse image, recognizable when received.

Description:
Information symbols or scenes, (reflective or nonreflective, positive or negative), are etched or formed onto the optical surfaces of laser diode arrays, MEMS arrays, and optical fibers, and the like, (optical switch devices), allowing these devices to function as laser pulse information image switches, producing a string of laser light pulses, each an image of information symbols or scenes.

The paradigm, this present invention is describes is the enabling factor. The technologies involved are well known, and this present invention is a unique, synergistic combination of art forms. These well known technologies and art forms are not the subject of this patent and have been described in the prior art.

The preferred embodiment at this time is a laser pulse image switch based on laser diode arrays. This present invention can also be described as: an optical image switch comprising symbols formed on the optical surfaces of a pulse laser diode array whereby emitted laser pulses are images of said symbols. The optical image switch above, further comprising symbols formed on MEMS gratings or prisms whereby reflected laser pulses are images of said symbols. The optical image switch above, further comprising: assembled disks of symbol etched optical fiber, each etched with micro-prisms or gratings to direct the out-lying photons into the symbol image tunnel sectors; tunnel length sufficient to fully form and stabilize the transiting laser pulse image before it exits as an optically corrected laser pulse image, recognizable when received, and, an array of said symbol image tunnels, addressable by a pulse laser, and, a multiplexer, whereby the transited laser pulse images are coordinated into a transited laser pulse image stream.

A method of producing a stream of laser pulse images comprising the steps of: providing symbols formed on pulse laser diode optical surfaces, and providing an array of said laser diodes, whereby a stream of emitted laser pulse images is produced by said laser diode array. The method above further comprising the steps of: providing reflective symbols formed on MEMS gratings or prisms, and, providing a MEMS array of said gratings or prisms, and, providing laser pulses, reflected by said symbols, whereby a stream of reflected laser pulse images is produced by said MEMS array. The method above further including the steps of: providing assembled disks of symbol formed optical fiber, each formed with micro-prisms, gratings, and/or mirrors to direct the out-lying photons into the symbol image tunnel sectors; the tunnel length sufficient to fully form and stabilize the transiting laser pulse image before it exits as an optically corrected laser pulse image, recognizable when received, and, providing, an array of said symbol image tunnels, addressable by a pulse laser, and, providing, a multiplexer, whereby the transited laser pulse images are coordinated into a transited laser pulse image stream. An image comprising at least one photon emitted from a pulse laser diode with a symbol formed on an optical surface, whereby the emitted laser pulse is an image of said symbol.

Understood, the symbols formed on the optical surfaces and the emitted laser pulse images are subject to optical correction techniques such that the received laser pulse image is recognized correctly. A different embodiment, as a keyboard output device in a vehicle, may operate within less than 5 meters with minimum correction. The prior art does not infer or imply, this present invention.

Further, a Laser Pulse Image Switch may be described as; an optical image switch comprising: assembled disks of symbol etched optical fiber, each etched with micro-prisms or gratings to direct the out-lying photons into the symbol image tunnel sectors; tunnel length sufficient to fully form and stabilize the transiting laser pulse image before it exits as an optically corrected laser pulse image, recognizable when received, and, an array of said symbol image tunnels, addressable by a pulse laser, and, a multiplexer, whereby the transited laser pulse images are coordinated into a transited laser pulse image stream.

And, a method creating an image output device including the steps of providing: assembled disks of symbol formed optical fiber, each formed with micro-prisms, gratings, and/or mirrors to direct the out-lying photons into the symbol image tunnel sectors; the tunnel length sufficient to fully form and stabilize the transiting laser pulse image before it exits as an optically corrected laser pulse image, recognizable when received, and, providing, an array of said symbol image tunnels, addressable by a pulse laser, and, providing, a multiplexer, whereby the transited laser pulse images are coordinated into a transited laser pulse image stream.

The image, above, comprising at least one photon of a laser pulse, transited from an optical fiber symbol image tunnel sector, whereby the transited laser pulse is an image of said symbol.

Or, an optical image switch comprising: means for creating laser pulse images, and means for creating a laser pulse image stream.

Operation:

A laser pulse, reflected or emitted or transited from a laser pulse image switch element would form a image of the symbol(s)/scene(s) on/in that element. These pulses could be ultra-short (e.g. femtosecond) and each pulse, a discrete, separate, and different image. The light pulse image(s) could be directed into an optical fiber for transmission. Projection of the light pulse image(s) onto a CCD chip (or screen) would provide readout. Storage might be recording of the symbol image(s) directly onto a CD (or with light stopping methods of Rowland Institute).

The laser pulse image emitter and the laser pulse image may be modified, (for example, adaptive optics, and proximity correction, and corrective micro-optics, etc.), to achieve laser pulse image recognition at the receiver, or CCD readout.

CONCLUSION, RAMIFICATIONS AND SCOPE

The limiting factor may be the minimum number of photons necessary to form an image. Many paths toward that limit appear possible: for example, extremely small symbols, extremely short light pulses, multiple symbols on each switch element, lens systems, very high element number switches; i.e. current MEMS switches have 256 mirrors (possible symbols), frequency multiplexing; i.e. each frequency of laser pulse forming an image, and reflective symbols on a non-reflective background. Alternatively: symbols might be formed directly onto the exit mirrors of lasers or lenses of laser diodes such that the emitted laser pulse, itself, is the image; or images created by transiting the laser pulse through an optical fiber image tunnel. Arrays of these laser pulse image structures would be laser pulse image switches, and would output streams of laser pulse images. Eventually, a laser pulse image may be worth a thousand bits.

The invention claimed is:

1. An optical symbol image switch comprising:
    assembled disks of symbol etched optical fiber, as, an optical fiber symbol image tunnel, the optical fiber having a single core,
    a pulsed laser light source,
    means for directing, by refraction-reflection, at least one photon of a laser pulse into the optical fiber symbol image tunnel, whereby, at least one photon of the laser pulse is formed into a symbolic structure, wherein the optical fiber symbol image tunnel length is substantially sufficient to fully form and stabilize the transiting laser pulse symbol image before it exits as an optically corrected laser pulse symbol image, recognizable when received, and, whereby the laser pulse symbol image is a laser light pulse with a wave-front pattern of a symbol, and, an array of optical fiber symbol image tunnels, addressable by the pulse laser, and, a multiplexer, whereby the transited laser pulse symbol images are coordinated into a transited laser pulse symbol image stream.

2. A method creating a symbol image output device including the steps of:

providing assembled disks of symbol etched optical fiber, creating a symbol image tunnel formed by said assembled disks of symbol etched optical fiber, the optical fiber having a single core, and, directing at least one photon of a laser pulse into said symbol image tunnel with a refraction-reflection-transmission device, whereby at least one photon of the laser pulse is formed into a symbolic structure, and, wherein the symbol image tunnel length is substantially sufficient to fully form and stabilize the transiting laser pulse symbol image before it exits as an optically corrected laser pulse symbol image, recognizable when received, and, whereby the laser pulse symbol image is a laser light pulse with a wave front pattern of a symbol, and, wherein an array of said symbol image tunnels are addressable by the pulse laser, and, multiplexing, the transited laser pulse symbol images, which exit the symbol image tunnel array, whereby the transited laser pulse symbol images are coordinated into a transited laser pulse symbol image stream.

* * * * *